United States Patent
Basu et al.

(10) Patent No.: US 11,112,883 B2
(45) Date of Patent: Sep. 7, 2021

(54) KEYBOARD HAVING KEYS WITH CONFIGURABLE SURFACE DISPLAYS

(71) Applicant: Dell Products L.P., Round Rock, TX (US)

(72) Inventors: Rangan Basu, Gurgaon (IN); Rohan Sharma, Delhi (IN); Shubham Gupta, Jaipur (IN)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 16/708,702

(22) Filed: Dec. 10, 2019

(65) Prior Publication Data

US 2021/0173494 A1    Jun. 10, 2021

(51) Int. Cl.
| | |
|---|---|
| *G06F 3/023* | (2006.01) |
| *G06F 3/02* | (2006.01) |
| *G09G 5/10* | (2006.01) |
| *G02B 26/10* | (2006.01) |
| *G06F 1/16* | (2006.01) |

(52) U.S. Cl.
CPC .......... *G06F 3/0238* (2013.01); *G06F 3/0202* (2013.01); *G09G 5/10* (2013.01); *G02B 26/105* (2013.01); *G06F 1/1662* (2013.01); *G09G 2320/0626* (2013.01)

(58) Field of Classification Search
CPC .......... H01L 2924/1461; G02B 26/105; G02B 26/0833; G06F 1/1662; G06F 3/02; G06F 3/0202; G06F 3/0238; B81B 7/02; G09G 2320/0626
See application file for complete search history.

(56) References Cited

U.S. PATENT DOCUMENTS

| | | | |
|---|---|---|---|
| 7,236,154 B1* | 6/2007 | Kerr | G09G 5/10 |
| | | | 345/102 |
| 10,347,443 B1* | 7/2019 | Wu | G02B 6/0023 |
| 2002/0075240 A1* | 6/2002 | Lieberman | G06F 3/0426 |
| | | | 345/170 |
| 2005/0157162 A1* | 7/2005 | Udy | G02B 26/0833 |
| | | | 347/247 |
| 2006/0152494 A1* | 7/2006 | Liess | G06F 1/1662 |
| | | | 345/169 |
| 2007/0094597 A1* | 4/2007 | Rostom | G06F 3/0482 |
| | | | 715/700 |
| 2008/0211779 A1* | 9/2008 | Pryor | G06F 3/04847 |
| | | | 345/173 |
| 2010/0214135 A1* | 8/2010 | Bathiche | G06F 3/0238 |
| | | | 341/23 |
| 2016/0351360 A1* | 12/2016 | Knopf | G06F 3/0202 |

* cited by examiner

*Primary Examiner* — Priyank J Shah
(74) *Attorney, Agent, or Firm* — Daly, Crowley, Mofford & Durkee, LLP

(57) ABSTRACT

Disclosed embodiments provide a durable keyboard that provides haptic feedback and configurable surface display that is brightly lit. The keyboard includes microelectromechanical systems (MEMS) for generating the key surface displays, such as one or more MEMS lasers and software-controllable scanning mirrors. The keyboard also includes an optical medium, having for example beam splitters, optical waveguides, and lenses, to divide each projected image among a number of keys, and route each divided portion to the correct key for display. Finally, the key contact circuitry and depressible keys themselves are designed to be transparent or translucent, so the respective image is shown with high contrast on the pressable surface of each key.

20 Claims, 4 Drawing Sheets

KEYBOARD HAVING KEYS WITH CONFIGURABLE SURFACE DISPLAYS

FIELD

The disclosure pertains generally to keyboards for electronic devices, and more particularly to keyboards having key switches with programmable surfaces.

BACKGROUND

Many electronic devices receive textual input from their users via a keyboard. A keyboard may be integral with such a device (as in a laptop computer) or separate from, but connected to the device (as in a wired USB keyboard or a wireless Bluetooth keyboard). Despite the variety of keyboards, the vast majority include keys that are printed with fixed symbols having fixed input functions, which can lead to a limited user experience. Various computer users, such as software developers, gamers, and visually-impaired users, may have different preferences for key function, with the latter group often preferring to use specialized keyboards. Moreover, computer users who wish to input text in different languages may struggle to use the same keyboard, especially if that keyboard is integral with the device.

Various solutions have been developed to address these problems. One solution is for the user to bring a separate keyboard (having fixed symbols) for each desired method of inputting data, e.g. one keyboard for each input language. However, this solution increases the cost and inconvenience of using the electronic device. Another solution is to provide a keyboard that is projected onto a surface (e.g. using an LCD projector) and a sensor to detect finger placement while typing, but this solution does not provide the haptic feedback (tactile key resistance) that many users want or require for fast typing, and may be difficult to use in bright light. Another solution is to use "electronic ink" or "electronic paper" for keys, but keyboards using this technology are difficult to use in low-visibility or dark environments, and have a short useful life due to fragility of the components which makes them especially unsuitable for integrated keyboards in particular. In short, existing keyboards lack a combination of durability, haptic feedback, and flexible configuration.

SUMMARY OF DISCLOSED EMBODIMENTS

Disclosed embodiments provide a durable keyboard having haptic feedback and brightly lit configurable surface display that can be used in a variety of lighting conditions. The keyboard includes a microelectromechanical system ("MEMS") for generating and projecting the key surface displays, such as one or more MEMS lasers and software-controllable scanning mirrors. The keyboard also includes an optical medium, such as beam splitters and/or optical waveguides, to divide each projected image among a number of keys, and to route each divided portion to the correct key for display. Finally, the key contact circuitry and depressible keys themselves are specially designed with transparent or translucent components, so the respective image is shown with high contrast on the surface of each key.

Advantageously, disclosed embodiments provide multilingual and multi-application support for a single keyboard through simple software configuration. End users are able to configure the font, character size, symbol color, and theme to suit their tastes. End users also may customize their keyboard according to various needs, including disabling certain keys during particular applications (e.g. gaming) or enabling custom icon-based keys for frequently-used functions that might otherwise require awkwardly complex, multi-key combinations. And special color schemes with pre-configured default images may be used to assist the visually challenged, including to provide keys having appropriate colors to individuals having color-blindness.

Thus, a first embodiment is a keyboard for providing input to an electronic device. The keyboard has a microelectromechanical system (MEMS) including a laser system for producing a laser beam and a scanning mirror for scanning the produced laser beam to generate a two-dimensional (2D) image. The keyboard also has a plurality of depressible keys, each key comprising a housing with a transparent or translucent surface, a pressure sensor, and a transparent dome mechanically coupled to the housing for contacting the pressure sensor when the key is pressed. The keyboard further has an optical medium for routing at least a portion of the generated 2D image for display on the surface of one of the plurality of depressible keys.

In some embodiments, the laser system comprises a plurality of diode lasers that output differently-colored laser beams.

In some embodiments, the optical medium includes a beam splitter, or an optical waveguide, or a lens, or any combination thereof.

In some embodiments, the generated 2D image comprises a plurality of portions, and the optical medium routes each such portion for display on the surface of a different key in the plurality of depressible keys.

Some embodiments include an integrated circuit for controlling the scanning mirror according to commands received from the electronic device. In some embodiments, each of the commands pertains to a size, or a color, or a font, of a grapheme in the generated 2D image.

Some embodiments include an integrated circuit for communicating, with the electronic device, wirelessly or using electrically conductive wires.

In some embodiments, the keyboard is an integral component of the electronic device.

In some embodiments, the electronic device is a laptop computer.

A second embodiment is a laptop computer. The laptop computer includes a keyboard having a plurality of depressible keys, each key comprising a housing with a transparent or translucent surface, a pressure sensor, and a transparent dome mechanically coupled to the housing for contacting the pressure sensor when the key is pressed. The laptop computer also has a microelectromechanical system (MEMS) including a laser system for producing a laser beam and a scanning mirror for scanning the produced laser beam to generate a two-dimensional (2D) image. The laptop computer further has an optical medium for routing at least a portion of the generated 2D image for display on the surface of one of the plurality of depressible keys.

In some embodiments, the laser system comprises a plurality of diode lasers that output differently-colored laser beams.

In some embodiments, the optical medium includes a beam splitter, or an optical waveguide, or a lens, or any combination thereof.

In some embodiments, the generated 2D image comprises a plurality of portions, and the optical medium routes each such portion for display on the surface of a different key in the plurality of depressible keys.

Some embodiments include a keyboard configuration controller for controlling the laser system and the scanning mirror.

In some embodiments, the keyboard configuration controller controls the laser system and the scanning mirror to produce a 2D image according to an application executing on a processor of the laptop computer.

Some embodiments include a sensor, wherein the keyboard configuration controller controls the laser system and the scanning mirror according to an environmental condition sensed by the sensor.

In some embodiments, the sensor includes a camera, and the keyboard configuration controller is configured to control the laser system and the scanning mirror to increase a brightness of the 2D image in response to the camera sensing an increased environment brightness, and to decrease a brightness of the 2D image in response to the camera sensing a decreased environmental brightness.

Some embodiments include a network port, wherein the keyboard configuration controller controls the laser system and the scanning mirror according to a setting received using the network port from a remote server.

In some embodiments, the keyboard configuration controller is configured to transmit local configuration data to the remote server using the network port.

Some embodiments include both a network port and a sensor, wherein the keyboard configuration controller controls the laser system and the scanning mirror by modifying the received setting according to an environmental condition sensed by the sensor.

DESCRIPTION OF THE SEVERAL VIEWS OF THE DRAWINGS

The manner and process of making and using the disclosed embodiments may be appreciated by reference to the drawings, in which.

DETAILED DESCRIPTION

Illustrated embodiments of the concepts, techniques, and structures disclosed herein pertain broadly to keyboards for electronic devices. It is appreciated that such keyboards may be used to provide input to a wide variety of electronic devices, including without limitation other devices attached via a wired data connection (such as USB) or a wireless data connection (such as Bluetooth), and devices in which the keyboard is integral with the device itself (such as a laptop computer). To frame the manner in which various embodiments interact with other electronic devices, it is appropriate to first review the makeup of such devices.

Figure 1:
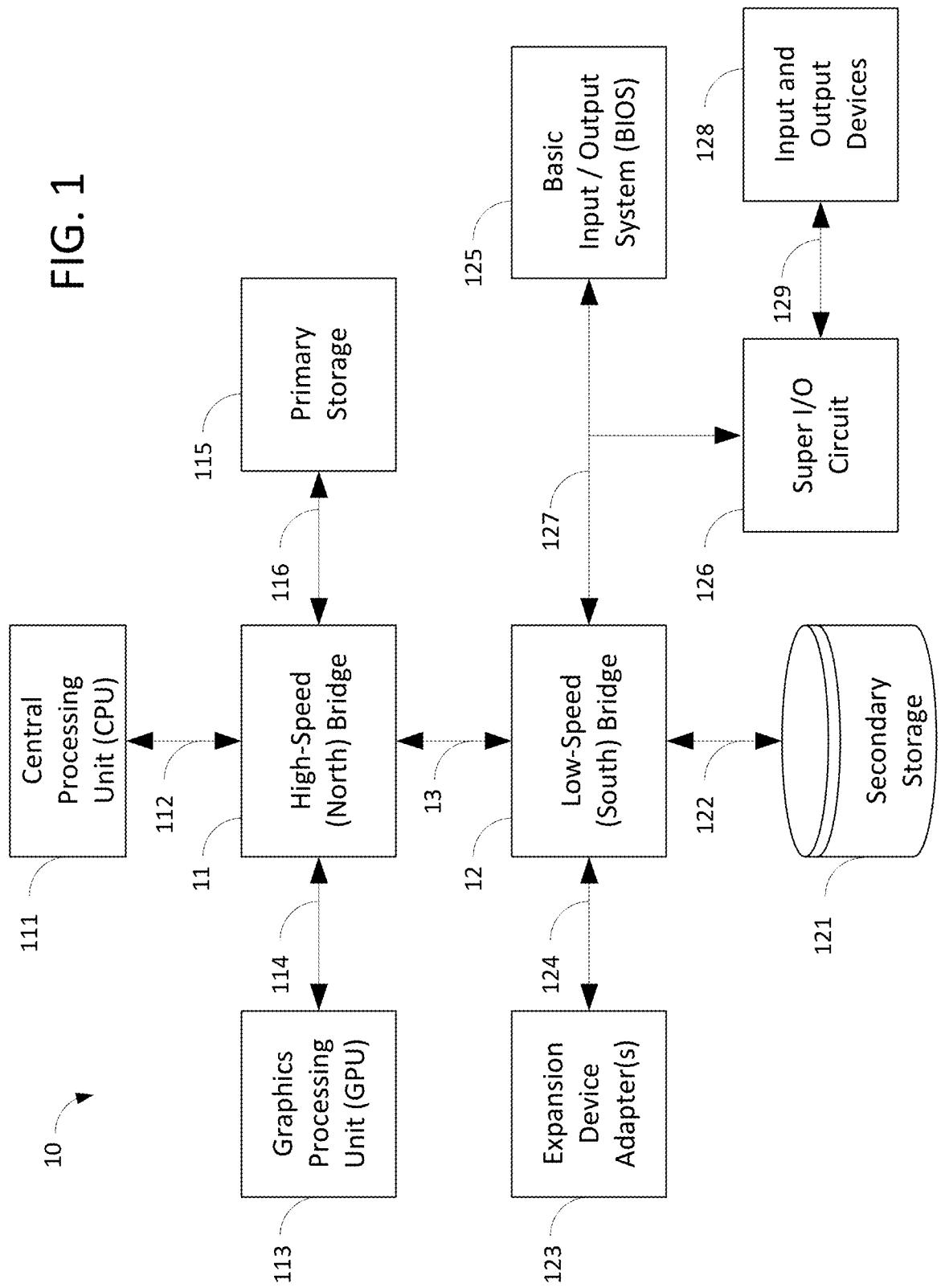
FIG. 1 schematically shows relevant physical components of a computer that may embody, or be used with embodiments of, the concepts, techniques, and structures disclosed herein.

FIG. 1 schematically shows relevant physical components of a computer processing system (or "computer") 10 that may embody, or be used with embodiments of, the concepts, structures, and techniques disclosed herein. Generally, the computer 10 has many functional components that communicate data with each other using data buses. The functional components of FIG. 1 are physically arranged based on the speed at which each must operate, and the technology used to communicate data using buses at the necessary speeds to permit such operation.

Thus, the computer 10 is arranged as high-speed components and buses 111 to 116 and low-speed components and buses 121 to 129. The high-speed components and buses 111 to 116 are coupled for data communication using a high-speed bridge 11, also called a "northbridge," while the low-speed components and buses 121 to 129 are coupled using a low-speed bridge 12, also called a "southbridge."

The computer 10 includes a central processing unit ("CPU") 111 coupled to the high-speed bridge 11 via a bus 112. The CPU 111 is electronic circuitry that carries out the instructions of a computer program. As is known in the art, the CPU 111 may be implemented as a microprocessor; that is, as an integrated circuit ("IC"; also called a "chip" or "microchip"). In some embodiments, the CPU 111 may be implemented as a microcontroller for embedded applications, or according to other embodiments known in the art.

The bus 112 may be implemented using any technology known in the art for interconnection of CPUs (or more particularly, of microprocessors). For example, the bus 112 may be implemented using the HyperTransport architecture developed initially by AMD, the Intel QuickPath Interconnect ("QPI"), or a similar technology. In some embodiments, the functions of the high-speed bridge 11 may be implemented in whole or in part by the CPU 111, obviating the need for the bus 112.

The computer 10 includes one or more graphics processing units (GPUs) 113 coupled to the high-speed bridge 11 via a graphics bus 114. Each GPU 113 is designed to process commands from the CPU 111 into image data for display on a display screen (not shown). In some embodiments, the CPU 111 performs graphics processing directly, obviating the need for a separate GPU 113 and graphics bus 114. In other embodiments, a GPU 113 is physically embodied as an integrated circuit separate from the CPU 111 and may be physically detachable from the computer 10 if embodied on an expansion card, such as a video card. The GPU 113 may store image data (or other data, if the GPU 113 is used as an auxiliary computing processor) in a graphics buffer.

The graphics bus 114 may be implemented using any technology known in the art for data communication between a CPU and a GPU. For example, the graphics bus 114 may be implemented using the Peripheral Component Interconnect Express ("PCI Express" or "PCIe") standard, or a similar technology.

The computer 10 includes a primary storage 115 coupled to the high-speed bridge 11 via a memory bus 116. The primary storage 115, which may be called "main memory" or simply "memory" herein, includes computer program instructions, data, or both, for use by the CPU 111. The primary storage 115 may include random-access memory ("RAM"). RAM is "volatile" if its data are lost when power is removed, and "non-volatile" if its data are retained without applied power. Typically, volatile RAM is used when the computer 10 is "awake" and executing a program, and when the computer 10 is temporarily "asleep", while non-volatile RAM ("NVRAM") is used when the computer 10 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 116 may be implemented using any technology known in the art for data communication between a CPU and a primary storage. The memory bus 116 may comprise an address bus for electrically indicating a storage address, and a data bus for transmitting program instructions and data to, and receiving them from, the primary storage 115. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 10 may use up to $8*2^{32}=32$ gigabytes (GB) of primary storage 115. In this example, the memory bus 116 will have a total width of 64+32=96 bits. The computer 10 also may include a memory controller circuit (not shown) that converts electrical signals received from the memory bus 116 to electrical signals expected by physical pins in the primary storage 115, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 111, the graphics processing units 113, the primary storage 115, and the high-speed bridge 11, or any combination thereof, as a single integrated circuit. In such embodiments, buses 112, 114, 116 may form part of the same integrated circuit and need not be physically separate. Other designs for the computer 10 may embody the functions of the CPU 111, graphics processing units 113, and the primary storage 115 in different configurations, obviating the need for one or more of the buses 112, 114, 116.

The depiction of the high-speed bridge 11 coupled to the CPU 111, GPU 113, and primary storage 115 is merely exemplary, as other components may be coupled for communication with the high-speed bridge 11. For example, a network interface controller ("NIC" or "network adapter") may be coupled to the high-speed bridge 11, for transmitting and receiving data using a data channel. The NIC may store data to be transmitted to, and received from, the data channel in a network data buffer.

The high-speed bridge 11 is coupled for data communication with the low-speed bridge 12 using an internal data bus 13. Control circuitry (not shown) may be required for transmitting and receiving data at different speeds. The internal data bus 13 may be implemented using the Intel Direct Media Interface ("DMI") or a similar technology.

The computer 10 includes a secondary storage 121 coupled to the low-speed bridge 12 via a storage bus 122. The secondary storage 121, which may be called "auxiliary memory", "auxiliary storage", or "external memory" herein, stores program instructions and data for access at relatively low speeds and over relatively long durations. Since such durations may include removal of power from the computer 10, the secondary storage 121 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 122 may be implemented using any technology known in the art for data communication between a CPU and a secondary storage and may include a host adaptor (not shown) for adapting electrical signals from the low-speed bridge 12 to a format expected by physical pins on the secondary storage 121, and vice versa. For example, the storage bus 122 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 10 also includes one or more expansion device adapters 123 coupled to the low-speed bridge 12 via a respective one or more expansion buses 124. Each expansion device adapter 123 permits the computer 10 to communicate with expansion devices (not shown) that provide additional functionality. Such additional functionality may be provided on a separate, removable expansion card, for example an additional graphics card, network card, host adaptor, or specialized processing card.

Each expansion bus 124 may be implemented using any technology known in the art for data communication between a CPU and an expansion device adapter. For example, the expansion bus 124 may transmit and receive electrical signals using a Peripheral Component Interconnect ("PCI") standard, a data networking standard such as an Ethernet standard, or a similar technology.

The computer 10 includes a basic input/output system ("BIOS") 125 and a Super I/O circuit 126 coupled to the low-speed bridge 12 via a bus 127. The BIOS 125 is a non-volatile memory used to initialize the hardware of the computer 10 during the power-on process. The Super I/O circuit 126 is an integrated circuit that combines input and output ("I/O") interfaces for low-speed input and output devices 128, such as a serial mouse and a keyboard. In some embodiments, BIOS functionality is incorporated in the Super I/O circuit 126 directly, obviating the need for a separate BIOS 125.

The bus 127 may be implemented using any technology known in the art for data communication between a CPU, a BIOS (if present), and a Super I/O circuit. For example, the bus 127 may be implemented using a Low Pin Count ("LPC") bus, an Industry Standard Architecture ("ISA") bus, or similar technology. The Super I/O circuit 126 is coupled to the I/O devices 128 via one or more buses 129. The buses 129 may be serial buses, parallel buses, other buses known in the art, or a combination of these, depending on the type of I/O devices 128 coupled to the computer 10.

Figure 2:
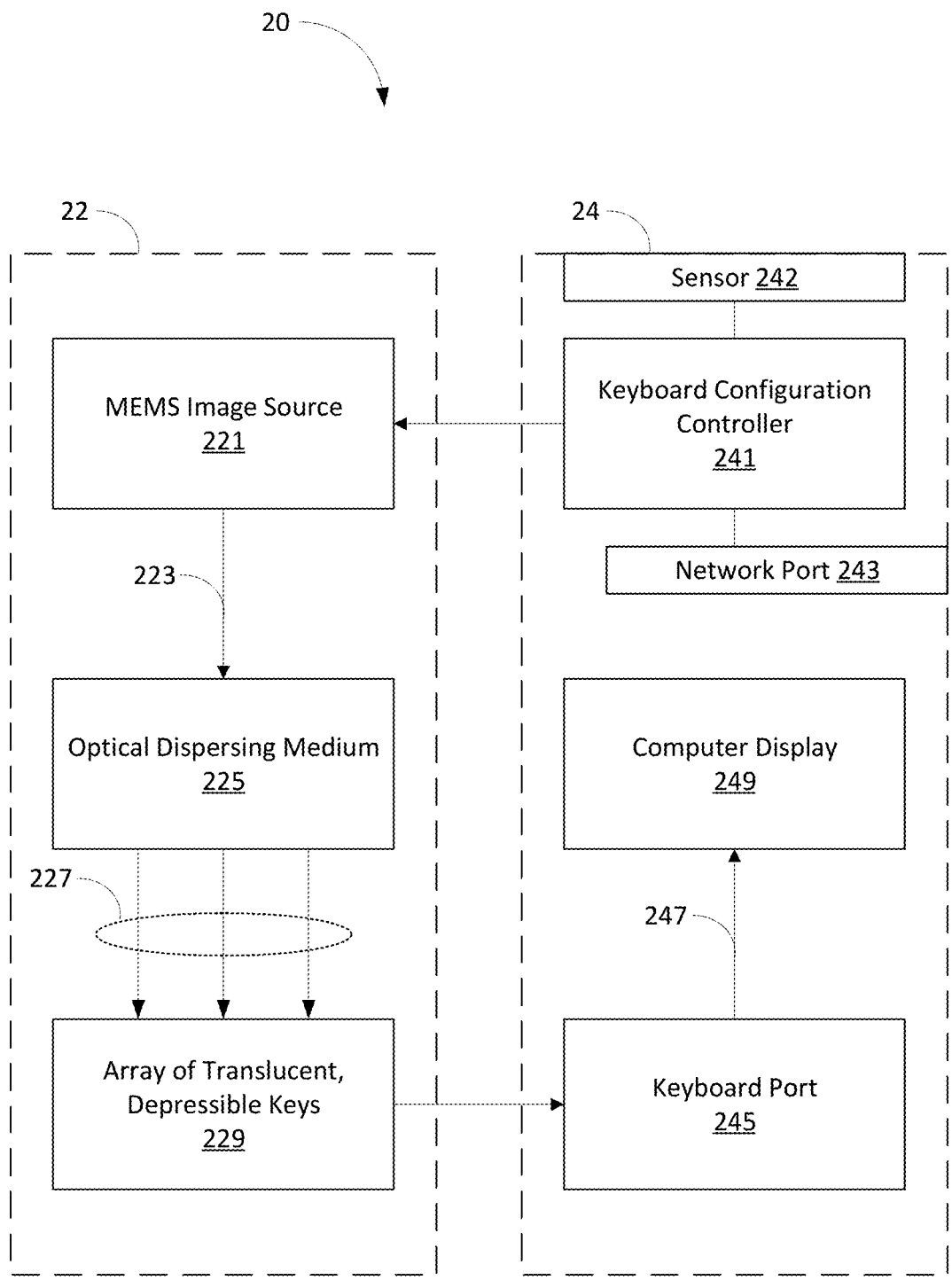
FIG. 2 schematically shows more detail of a computer according to an embodiment, including a keyboard having keys with configurable surface displays.

In FIG. 2 is shown more detail of a computer 20 according to an embodiment. The computer 20 may be, for example, the computer 10. The computer 20 has a keyboard 22 having keys with configurable surface displays, which keyboard may be, for example, an input device 128. The computer 20 also has a housing 24 that includes additional hardware and software components.

In some embodiments, the keyboard 22 and the housing 24 are provided as separate components, for example when the keyboard 22 connects to the housing 24 via a communication port, such as a wired USB port or a wireless Bluetooth port (i.e. using a bus, such as bus 129). In such embodiments, the keyboard 22 may include an integrated circuit (IC) for communicating with the components in the housing 24 wirelessly or using electrically conductive wires, especially for receiving configuration commands from those components. In other embodiments, the keyboard 22 and the housing 24 are provided as an integral device, for example when the computer 20 is a laptop computer. In what follows, the keyboard 22 and the housing 24 are described as separate components of the computer 20 for clarity only, and not to limit the scope of the inventive subject matter.

Broadly, the keyboard 22 displays configurable symbols (such as language graphemes) on each of its keys as an actively-lit image that is configured using commands received from the housing 24. In FIG. 2, the flow of information between the keyboard 22 and the housing 24 is represented by the arrows. The two unlabeled arrows represent communication between the keyboard 22 and the housing 24 according to techniques and data communication protocols known in the art and as described above.

The keyboard 22 is described with reference to microelectromechanical system (MEMS) technologies. However, it is appreciated that technologies other than MEMS, known to a person having ordinary skill in the art, may be used to implement the concepts, techniques, and structures disclosed herein. For example, nanoelectromechanical systems (NEMS) may be used in place of MEMS wherever the latter is referenced. Thus, embodiments are described in connection with MEMS for the sake of clarity and ease of understanding only, and not to limit the scope of the inventive subject matter.

The keyboard 22 includes at least one microelectromechanical system (MEMS) image source 221 that creates and projects images to be displayed on an array of translucent, depressible keys 229. In accordance with one embodiment, each MEMS image source 221 includes a laser system for producing a laser beam and a scanning mirror for scanning the produced laser beam to generate a 2D image 223. The 2D image itself may include portions to be displayed on multiple keys 229. Thus, the keyboard 22 may include an optical dispersing medium 225 to segment and/or route multiple portions 227 of the 2D image 223 to different keys 229 for display of one portion on each key. The optical dispersing medium 225 may include beam splitters, optical waveguides, converging or diverging lenses, or other structures known in the art for accomplishing the above-described functions. The structure and operation of a MEMS image source 221 are explained below in connection with FIG. 3, while the structure and operation of the depressible keys 229 are explained below in connection with FIG. 4.

The keyboard 22 may include multiple MEMS image sources 221 depending, for example, on the total number of keys 229, a desired number of pixels to be displayed on each key, and the number of pixels capable of production by each scanning mirror. In some embodiments, one or more of the MEMS image sources 221 may include a laser system having multiple diode lasers that output differently-colored laser beams. Such a MEMS image source 221 includes a scanning mirror that scans each laser beam to produce color pixels, so some or all of the portions of the generated 2D image may contain pixels of any desired color. It is appreciated that in embodiments having multiple MEMS image sources 221, some of the MEMS image sources 221 may be unicolor and some of the MEMS image sources 221 may be multicolor, depending on which keys 229 of the keyboard 22 are desired to be capable of displaying only monochrome images and which keys 229 are desired to be capable of displaying full-color images.

The housing 24 includes a keyboard configuration controller 241, which may be a combination of hardware and software. The keyboard configuration controller 241 may be implemented in any manner consistent with the teachings herein, and a person having ordinary skill in the art of computer programming should be able to implement it. The keyboard configuration controller 241 transmits keyboard configuration commands to the keyboard 22 according to the preferences of a user of the computer 20. The keyboard configuration commands, in turn, direct the MEMS image source 221 to produce a desired 2D image for display on one or more of the keys 229. Meanwhile, the keyboard configuration controller 241 associates each image for display on the keys 229 with a corresponding function. For example, if it is desired for a particular key 229 to display the letter "L", then the keyboard configuration controller 241 associates a press of that key to a function associated with the letter "L" (which may be to cause a currently executing application to receive this letter as input).

Advantageously, a spinning mirror, or similar device in the MEMS image source 221 for generating an output 2D image, may be configured to display any arbitrary image. Thus, in various embodiments, the keyboard configuration controller 241 may control the MEMS image source 221 to choose the 2D image as a function of any number of considerations. In case a language input is desired, the keyboard configuration controller 241 may provide default or configurable settings for displaying a 2D image having characters with a given language, font, color, and according to a key layout (e.g. QWERTY, Dvorak, Brahmic, Arabic, Cyrillic, Hangul, and so on). In case a particular application has functions that a user desires to map to particular keys, the keyboard configuration controller 241 may allocate certain symbols to those keys, permitting those functions to be performed without complex key-combination, mouse inputs, or navigating complex menu systems. For example, a financial analyst may desire to input a currency symbol € or ¥ by pressing a single key, in which case he or she may use the keyboard configuration controller 241 to configure a desired key to have this function and display the corresponding symbol. Likewise, a gamer may desire to input a particular gaming function by pressing a single key, and operate the keyboard configuration controller 241 to configure the keyboard 22 accordingly.

The keyboard configuration controller 241 further may be configured to control the MEMS image source 221 to display a 2D image based on a particular application currently executing in the computer 20. Thus, when a first application (such as a word processor) executes, the keyboard configuration controller 241 may control the MEMS image source 221 to display a standard keyboard layout. However, when a second application (such as a game) executes, the keyboard configuration controller 241 may control the MEMS image source 221 to display a gaming keyboard layout.

The keyboard configuration controller 241 also may be configured to control the MEMS image source 221 to display a 2D image using adaptive intelligence as a function of environmental conditions, such as ambient lighting or device movement (as detected by a sensor 242 inside, or on a surface of, the housing 24). Thus, the keyboard configuration controller 241 may apply an artificial intelligence (AI) algorithm, such as a maximum likelihood (ML) algorithm using a neural net, to determine an optimal brightness, font, character size, or other feature of the image to be displayed on each key as a function of these conditions. The initial bucket classification may use a decision tree model, while ongoing training may use a random forest algorithm. It is appreciated that other AI algorithms may be used in various embodiments, as design requirements dictate.

Thus, for example, a camera in sensor 242 may continuously or intermittently detect an ambient brightness, and the keyboard configuration controller 241 may responsively and dynamically increase or decrease a brightness, contrast, or character size or change a font to adapt to changing brightness levels. Other sensors 242 may be used, including a webcam, proximity sensor, or motion sensor, and hysteresis data also may be used. It is appreciated that the keyboard configuration controller 241 may determine an image to display on each key 229 as a function of any or all of the above considerations, and further considerations not discussed herein but within the understanding of a person having ordinary skill in the art.

The keyboard configuration controller 241 of such an embodiment may participate in a federated-based learning model. Thus, the keyboard configuration controller 241 may perform partial computation of the AI algorithm locally, and transmit results to a central location using a network port 243 (e.g. as part of a network adapter 123). The central location, which may be a server computer or distributed computing system, collects such data from a large number of computers 20 and classifies display settings for keys according to relative levels of user preference, to determine globally optimized, default settings. The default settings may apply in all situations, or may be tailored to only some situations (e.g. when particular applications are executing in a computer 20). The central location may then program or reprogram each individual computer 20 using those settings whenever the computer 20 has connectivity to an appropriate data network, such as the Internet. The computer 20 then may use those settings advantageously when it lacks such connectivity. Moreover, the computer 20 may adjust those settings dynamically using local environmental information or user preferences, as described above and according to methods that should be understood by a person having ordinary skill in the art.

The housing 24 further includes a keyboard port 245 that receives data from the keyboard 22 regarding pressed keys 229. These data, which are typically received as the keys are pressed, are provided via an application 247 executing in the computer 20 to a computer display 249. Thus, for example, if a word processing application is executing when a key 229 on the keyboard 20 is pressed and the key is currently displaying the letter "L", the computer port 245 will provide the data "L" to the application for display as a letter "L" on the computer display according to a display configuration (e.g. font, size, etc.) of the application.

Figure 3:
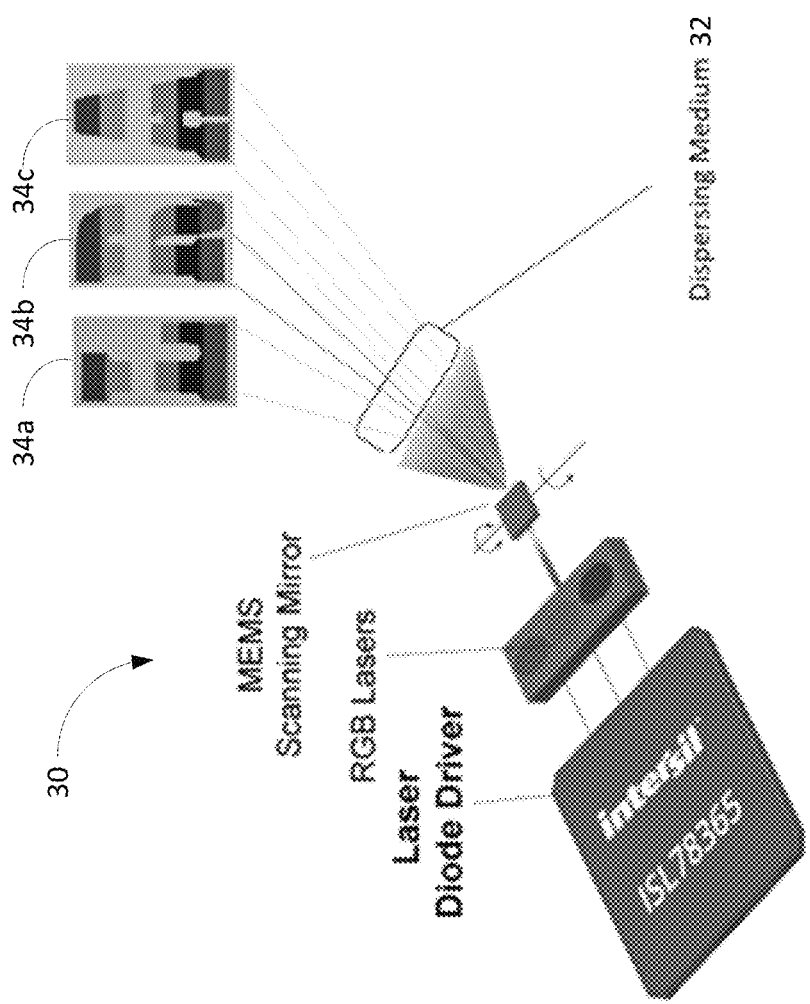
FIG. 3 schematically illustrates operation of a MEMS laser projector in accordance with an embodiment.

FIG. 3 schematically illustrates operation of a MEMS laser projector 30 and dispersing medium 32 in accordance with an embodiment. The MEMS laser projector 30 may implement, for example, the MEMS image source 221 of FIG. 2, while the dispersing medium 32 may implement or partially implement the optical dispersing medium 225 of FIG. 2. The components shown in FIG. 3 are merely illustrative of one possible implementation of the concepts, techniques, and structures disclosed herein using commercially available parts. It is appreciated that other designs and implementations may be within the abilities of a person of ordinary skill in the art.

The illustrative MEMS laser projector 30 includes red, green, and blue (RGB) lasers. The RGB lasers are driven by an integrated circuit, labeled as the Laser Diode Driver. Meanwhile, the three-color output of the RGB lasers is sent into a MEMS Scanning Mirror to produce a 2D output image of the MEMS laser projector 30. In illustrative embodiments, the Laser Diode Driver and the MEMS Scanning Mirror are controlled by a controller, such as the keyboard configuration controller 241 of FIG. 2.

The dispersing medium 32 takes the 2D output image of the MEMS laser projector 30 and distributes its portions to a number of different depressible keys for display. Thus, for example, the dispersing medium 32 may include a beam splitter to divide the 2D output image into portions, such as the three portions indicated in FIG. 3 as 34a, 34b, and 34c. The dispersing medium also may include optical waveguides, such as fibers having a surface with high coefficient of reflectivity, to route the portions to keys corresponding to the portions. The dispersing medium 32 also may have lenses to magnify the portions, as required. It is appreciated that other structures may be used in the dispersing medium 32 to accomplish the functions described above. Advantageously, the dispersing medium 32 has fixed optical properties that may be used to configure the MEMS laser projector 30 to produce an output that results in displayed portions 34a, 34b, 34c that have a high fidelity to idealized images commanded to be displayed by the projector controller.

Figure 4:
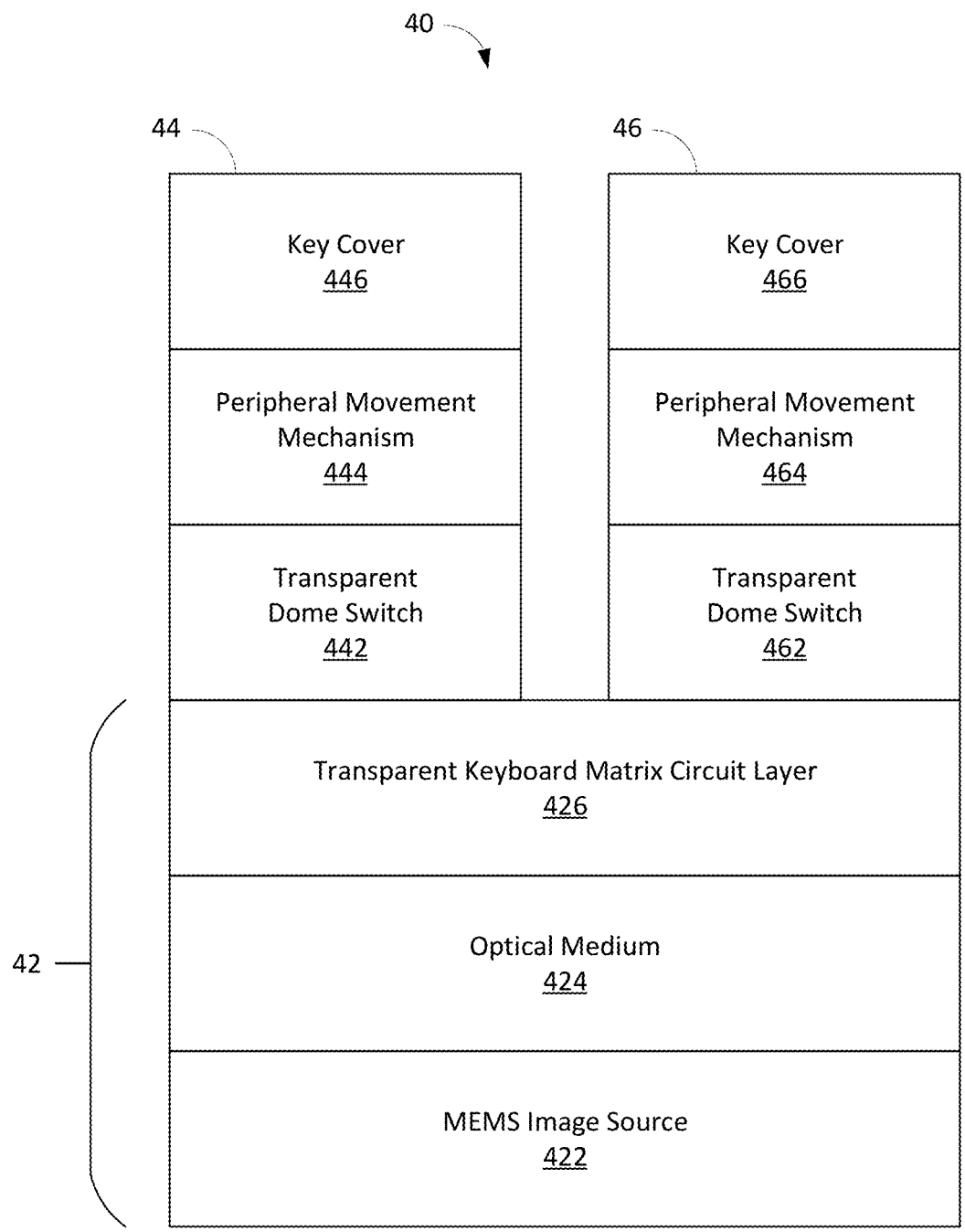
FIG. 4 schematically shows a portion of a keyboard having keys with configurable surface displays.

FIG. 4 schematically shows a portion of a keyboard 40 having keys with configurable surface displays. The keyboard 40 may be the keyboard 22 of FIG. 2. The keyboard 40 includes a substrate 42 and two keys 44 and 46 having identical structure. It is appreciated that in useful embodiments, the keyboard 40 will have many more than two keys, so FIG. 4 should be viewed as merely illustrative.

The substrate 42 includes a MEMS image source 422, an optical medium 424, and a transparent keyboard matrix circuit layer 426. The MEMS image source 422 may be implemented, for example, as the MEMS laser projector 30 of FIG. 3. The optical medium 422 may be, for example, the dispersing medium 32 of FIG. 3, and receives a 2D output image from the MEMS image source 422. The circuit layer 426 includes circuitry for sensing key presses, as known in the art. The circuit layer 426 is transparent, so that output images (e.g. portions 34a and 34b of FIG. 3) may pass into the keys 44 and 46. To the extent that the circuit layer 426 causes any fixed distortion of the output images of the MEMS image source 422, such distortion can be inverted in the optical medium 424 so that an undistorted image is provided to the visible surface of the keys 44, 46.

The key 44 includes a transparent dome switch 442, a peripheral movement mechanism 444, and a key cover 446. The key 46 is identically designed, and includes a transparent dome switch 462, a peripheral movement mechanism 464, and a key cover 466. For simplicity, the remainder of the disclosure explains the operation of key 44 only; the operation of key 46 is identical. It is appreciated that there are many different possible designs for keys that may use other components (e.g. silicone membrane switches rather than dome switches), and thus FIG. 4 should be viewed as illustrative of only one possible implementation of the concepts, techniques, and structures disclosed herein.

The switch 442 is a flexible membrane having an electrically conductive pad. When the key 44 is pressed, the pad contacts the circuit layer 426, thereby closing a circuit and causing a "key 44 pressed" signal to be sent to circuitry in the keyboard 40 (e.g. for encoding the identity of the key for transmission to another part of the computer for processing). When the key 44 is released, the pad breaks contact with the circuit layer 426, thereby opening the circuit. The switch 442 is transparent, allowing images for display on the surface of the key 44 to pass through. To the extent that the switch 442 causes any fixed distortion of the output images of the MEMS image source 422 (e.g. if the dome acts as a lens), such distortion can be inverted in the optical medium 424 so that an undistorted image is provided to the pressable surface of the key 44.

Movement of the switch 442 is controlled by the peripheral movement mechanism 444. This mechanism 444 is peripheral in the sense that its mechanical components are restricted to the periphery of the key 44. Thus, the mechanism 444 may have the shape of two square plastic pieces coupled to each other using plastic butterfly or scissors components on opposing edges, as known in the art. The square pieces contact the transparent dome switch 442 and the translucent key cover 446, respectively, to provide mechanical coupling, while the butterfly component has sufficient key-press resistance and restorative pressure to provide a pleasing and useful haptic feedback to a user pressing the key 44. The movement mechanism 444 is peripheral so that it provides no distortion to images for viewing on the pressable surface of the key 44.

Finally, the key 44 includes a key cover 446. The key cover 446 is transparent or translucent so that images originating in the MEMS image source 422 appear on its visible pressing surface with a high contrast. If the key cover 446 is transparent, the key 44 has a glassy appearance and the circuit layer 426, the switch 442, and the movement mechanism 444 may be partially or completely visible. If the key cover 446 is translucent, the underlying mechanism is hidden, although the image projected onto its pressable surface may be slightly diffused, leading to lower image quality. It is appreciated that the designer of the keyboard 40 may choose one type of key cover 446 over the other for any reason, and that any degree of translucence may be used in various embodiments without deviating from the concepts, techniques, and structures disclosed herein.

The techniques and structures described herein may be implemented in any of a variety of different forms. For example, features of the invention may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A keyboard for providing input to an electronic device, the keyboard comprising:
  a microelectromechanical system (MEMS) including a laser system for producing a laser beam and a scanning mirror for scanning the produced laser beam to generate a two-dimensional (2D) image;
  a plurality of depressible keys, each key comprising a movable key cover with a transparent or translucent surface, a pressure sensor, and a transparent dome mechanically coupled to the movable key cover for contacting the pressure sensor when the key is pressed; and
  an optical medium for routing at least a portion of the generated 2D image for display on the surface of the movable key cover of one of the plurality of depressible keys.

2. The keyboard according to claim 1, wherein the laser system comprises a plurality of diode lasers that output differently-colored laser beams.

3. The keyboard according to claim 1, wherein the optical medium includes a beam splitter, or an optical waveguide, or a lens, or any combination thereof.

4. The keyboard according to claim 1, wherein the generated 2D image comprises a plurality of portions, and the optical medium routes each such portion for display on the surface of a different key in the plurality of depressible keys.

5. The keyboard according to claim 1, further comprising an integrated circuit for controlling the scanning mirror according to commands received from the electronic device.

6. The keyboard according to claim 5, wherein each of the commands pertains to a size, or a color, or a font, of a grapheme in the generated 2D image.

7. The keyboard according to claim 1, further comprising an integrated circuit for communicating, with the electronic device, wirelessly or using electrically conductive wires.

8. The keyboard according to claim 1, wherein the keyboard is an integral component of the electronic device.

9. The keyboard according to claim 1, wherein the electronic device is a laptop computer.

10. A laptop computer comprising:
  a keyboard having a plurality of depressible keys, each key comprising a movable key cover with a transparent or translucent surface, a pressure sensor, and a transparent dome mechanically coupled to the movable key cover for contacting the pressure sensor when the key is pressed;
  a microelectromechanical system (MEMS) including a laser system for producing a laser beam and a scanning mirror for scanning the produced laser beam to generate a two-dimensional (2D) image; and
  an optical medium for routing at least a portion of the generated 2D image for display on the surface of the movable key cover of one of the plurality of depressible keys.

11. The laptop computer according to claim 10, wherein the laser system comprises a plurality of diode lasers that output differently-colored laser beams.

12. The laptop computer according to claim 10, wherein the optical medium includes a beam splitter, or an optical waveguide, or a lens, or any combination thereof.

13. The laptop computer according to claim 10, wherein the generated 2D image comprises a plurality of portions, and the optical medium routes each such portion for display on the surface of a different key in the plurality of depressible keys.

14. The laptop computer according to claim 10, further comprising a keyboard configuration controller for controlling the laser system and the scanning mirror.

15. The laptop computer according to claim 14, wherein the keyboard configuration controller controls the laser system and the scanning mirror to produce a 2D image according to an application executing on a processor of the laptop computer, or a desired input language, or both an application and a desired input language.

16. The laptop computer according to claim 14, further comprising a sensor, wherein the keyboard configuration controller controls the laser system and the scanning mirror according to an environmental condition sensed by the sensor.

17. The laptop computer according to claim 16, wherein the sensor includes a camera, and the keyboard configuration controller is configured to control the laser system and the scanning mirror to increase a brightness of the 2D image in response to the camera sensing an increased environment brightness, and to decrease a brightness of the 2D image in response to the camera sensing a decreased environmental brightness.

18. The laptop computer according to claim 14, further comprising a network port, wherein the keyboard configuration controller controls the laser system and the scanning mirror according to a setting received using the network port from a remote server.

19. The laptop computer according to claim 18, wherein the keyboard configuration controller is configured to transmit local configuration data to the remote server using the network port.

20. The laptop computer according to claim 18, further comprising a sensor, wherein the keyboard configuration controller controls the laser system and the scanning mirror by modifying the received setting according to an environmental condition sensed by the sensor.

* * * * *